United States Patent Office 3,816,512
Patented June 11, 1974

3,816,512
TELOMER FROM ALKYL ACRYLATE OR METHACRYLATE AND SULFURYL HALIDE
Charles M. Starks, Ponca City, Okla., assignor to Continental Oil Company, Ponca City, Okla.
No Drawing. Filed July 5, 1972, Ser. No. 269,008
Int. Cl. C07c 69/34
U.S. Cl. 260—485 H         11 Claims

ABSTRACT OF THE DISCLOSURE

A novel alkylacrylate or methacrylate telomer is formed by telomerizing an alkyl acrylate or methacrylate with a sulfuryl halide. For example, methyl acrylate is reacted with sulfuryl chloride to form $\alpha,\omega$-dichloropoly-(methoxycarbonyl)alkane telomers. The telomers formed are employed to extract a halogenated hydrocarbon compound from a mixture comprising a halogenated hydrocarbon compound plus an alkane. The telomer is also employed to extract an aromatic hydrocarbon from a mixture comprising an aromatic hydrocarbon plus an alkane and/or alkene.

BACKGROUND OF THE INVENTION

This invention relates to novel alkyl acrylate or methacrylate telomers which are generically dihalopolyalkoxycarbonylalkanes.

This invention also relates to a process for synthesizing alkyl acrylate or methacrylate telomers comprising contacting a sulfuryl halide with an alkyl acrylate or methacrylate.

This invention further relates to a method for extracting a halogenated hydrocarbon from a mixture comprising a halogenated hydrocarbon plus an alkane which comprises contacting the mixture with an alkyl acrylate or methacrylate telomer and then separating the phases formed.

The invention still further relates to a method for separating an aromatic hydrocarbon from a mixture comprising an aromatic hydrocarbon plus an alkane or alkene comprising contacting the mixture with an alkyl acrylate or methacrylate telomer and then separating the two liquid phases formed.

The state of the art is known to the applicant and relating to the instant invention is presented by the following representative references.

U.S. 2,195,712 discloses that an alkyl acrylate such as methyl methacrylate or methyl acrylate is reacted with chlorine to form a dimer of the acrylate esters. Thus, reaction of chlorine with methyl methacrylate produces 2,4 - di(methoxycarbonyl) - 2,5 - dichloro-5-methylpentane. However, chlorination of methyl acrylate produces a tetrachlorinated dimer of methyl acrylate. Chlorine rather than sulfuryl chloride is employed and a different product than that of the instant invention is produced.

U.S. 2,204,517 discloses that polymers of acrylate esters such as methyl acrylate and methyl methacrylate are produced by contacting the acrylate ester with a peroxide catalyst such as benzoyl peroxide. The polymers produced are of relatively high molecular weight and are not telomers.

U.S. 2,286,264 discloses that methyl alpha-chloroacrylates are polymerized by contacting with a peroxide catalyst, with sulfur dioxide, or with a sulfur dioxide yielding substance. Sulfur dioxide is produced in situ according to the instant invention. Furthermore, U.S. 2,302,228 discloses that sulfuryl chloride can serve as a source of chlorine atoms in the presence of an organic peroxide. Materials such as alkyl esters of organic carboxylic acids are chlorinated with sulfuryl chloride in the presence of a peroxide catalyst. Sulfur dioxide may be a byproduct when sulfuryl chloride is used to chlorinate an organic compound. Thus, superficially U.S. 2,302,228 in view of U.S. 2,286,264 might suggest that contacting sulfuryl chloride with a compound such as methyl acrylate would cause polymerization and chlorination. However, it should be noted that these references do not predict the telomerization of the instant invention.

U.S. 2,837,580 discloses that chlorine and sulfuryl chloride are both telogens. Sulfuryl chloride is employed as a telogen to telomerize a haloolefinic monomer in the presence of a catalyst such as a peroxide. However, it does not appear obvious to employ sulfuryl chloride as a telomerizing agent for alkyl acrylate based upon the teaching of this reference. The reference only teaches that compounds containing a halogen attached to one of the carbon atoms attached to a double bond are sufficiently stable to halogenation that they can be successfully telomerized. It would not be obvious to try to telomerize alkyl acrylates or alkyl methacrylates based upon this reference insofar as the reference teaches that styrene and acrylonitrile when subjected to telomerizing conditions as taught in the reference yielded chlorinated monomers rather than telomers.

U.S. 3,427,357 discloses that chlorinated hydrocarbons can be separated from mixtures comprising hydrocarbons and chlorinated hydrocarbons by liquid-liquid extraction employing a relatively polar solvent. However, the novel telomers of the instant invention do not appear to be suggested.

Other U.S. patents are noted which appear to be merely repetitive of the patents specifically treated or which appear to be less relevant include U.S. 2,909,570; U.S. 2,630,453; U.S. 2,598,639; U.S. 2,752,387; U.S. 3,116,250; U.S. 3,165,501; and U.S. 3,378,533.

Improved means of separating organic compounds are constantly sought after by industry. This invention provides means for separating mixtures of organic compounds which are often difficult to separate by conventional methods.

Alkyl acrylate or methacrylate telomers are compositions which are useful for a variety of uses including the separation of organic compounds from mixtures which are otherwise difficult to separate. This invention provides a novel class of alkyl acrylate or methacrylate telomers and provides a means for synthesizing alkyl acrylate or methacrylate telomers which are generically dihalopolyalkoxycarbonylalkanes.

OBJECTS OF THE INVENTION

One object of the invention is to produce novel alkyl acrylate or methacrylate telomers. Another object is to separate mixtures comprised of a halogenated hydrocarbon compound and an alkane.

A still further object is to separate a mixture comprising an aromatic hydrocarbon plus an alkane (or alkene).

SUMMARY OF THE INVENTION

In one aspect this invention discloses alkyl acrylate or methacrylate telomers which are dihalopolyalkoxycarbonylalkanes as novel compositions of matter.

In another aspect, a process is disclosed for the preparation of alkyl acrylate or methacrylate telomers by reacting a sulfuryl halide with an alkyl acrylate or methacrylate.

In still another aspect, alkyl acrylate or methacrylate telomers are employed as selective solvents to separate mixtures comprising a halogenated hydrocarbon and an alkane.

In still another aspect, alkyl acrylate or methacrylate telomers are employed to separate mixtures comprising an aromatic hydrocarbon plus an alkane or alkene.

DESCRIPTION OF THE PREFERRED EMBODIMENTS

According to the instant invention, novel alkyl acrylate or methacrylate telomers are produced. Such telomers are formed by telomerizing an alkyl acrylate or methacrylate with a sulfuryl halide, said telomerization conversion being represented as follows:

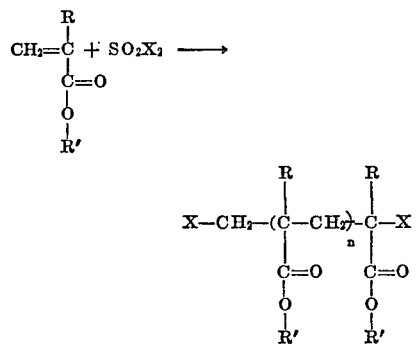

wherein X is fluorine, chlorine, bromine, or iodine; wherein R is hydrogen or methyl; wherein R' is alkyl having 1 to about 20 carbon atoms; and wherein $n$ is 2 to about 10.

According to a presently preferred mode of operation, X is chlorine, R' is alkyl having 1 to 5 carbon atoms, and $n$ is 2 to 5.

The telomers produced wherein R' is methyl are particularly desirable and useful compositions.

1,3 - Di(alkoxycarbonyl)-1,4-dichloroalkanes are also formed according to one embodiment of this invention wherein $n$ is 1.

Examples of some suitable alkyl acrylates or methacrylates which can be employed include methyl acrylate, methyl metacrylate, ethyl acrylate, butyl acrylate, hexyl acrylate, hexadecyl acrylate, 2-methyloctyl acrylate, eicosyl methacrylate, and the like.

The sulfuryl halide telogen employed can include sulfuryl bromide, sulfuryl fluorochloride, sulfuryl bromochloride, sulfuryl chloride, and the like. It is presently particularly preferred to employ sulfuryl chloride. It is also within the scope of this invention to generate the sulfuryl halide in situ, i.e., by passing into the telomerizing mass a mixture of $SO_2$ and halogen, in the proper stoichiometric quantities, either as liquids or gases or both.

Temperatures in the range of 25 to 250° C. are suitable for the telomerization conversion of the alkyl acrylate and sulfuryl halide of this invention to form an alkyl acrylate telomer. At temperatures below about 25° C. the rate of reaction is not generally feasible, and solid materials having higher molecular weights are formed. At temperatures above about 250° C., decomposition problems become serious. Preferably, temperatures in the range of about 50 to 150° C., are most suitably employed.

Pressure sufficient to maintain sufficient quantities of the alkyl acrylate and the sulfuryl chloride in the reaction environment must be employed. Elevated pressures of as high as about 30,000 p.s.i.g. can be employed. In general, pressures in the range of about 10 p.s.i.a. to 1000 p.s.i.g. are most suitable for optimum results. However, pressures in the range of 10 p.s.i.a. to 30,000 p.s.i.g. are normally satisfactory.

A chlorine complexing solvent can be employed in the reaction environment if desired. Inert diluents can also be employed. If desired, a perfluorochlorinated lower alkane can be employed. Mixtures of perfluorochlorinated alkanes and mixtures of such with chlorine complexing solvents and/or inert diluents can also be employed if desired.

A reaction time sufficient to effect the degree of conversion desired is employed. Reaction times in the range of about 5 seconds to 3 hours are suitable. Excessive reaction times tend to produce undesirable side reactions.

A chemical free radical initiator can be employed to promote the telomerization conversion of the alkyl acrylate and sulfuryl halide to form the alkyl acrylate telomers if desired. Any chemical free radical forming initiator known to the prior art to form free radicals can be employed. Some suitable chemical free radical initiators include organic peroxides, such as benzoyl peroxide, acetyl peroxide, t-butyl peroxide, t-butyl peracetate, ethyl peroxide, t-butyl perbenzoate, succinic peroxide, diisopropylpercarbonate, and the like; as well as azobisisobutyronitrile, other azo compounds, triphenylchloromethane, copper oxides, iron oxides, chromium, tetraethyl lead and the like. The reaction can be thermally initiated if desired. Other free radical initiating means such as gamma radiation can also be employed.

A ratio of about 1 to about 1000 moles of alkyl acrylate per mole of sulfuryl halide can be employed. A preferred ratio is about 8 to 50 moles of alkyl acrylate per mole of sulfuryl halide.

When a chemical, free radical initiating means is employed, about 0.0001 to 0.10 moles of chemical free radical forming initiator per mole of sulfuryl chloride is often suitable.

The alkyl acrylate telomers produced according to the process of this invention can be separated from each other and from any other materials present by any means known to the art for separation of organic chemicals. For example, fractional distillation, fractional crystallization, selective solvents, chromatography, and the like can be employed.

According to one presently preferred embodiment, the sulfuryl halide is added very slowly to the alkyl acrylate as the reaction progresses.

The alkyl acrylate telomers of the invention, which are dihalopolyalkoxycarbonyl alkanes, are useful materials. Thus, according to a process of the invention, a halogenated hydrocarbon compound having the formula Y-X' is separated from a fluid mixture comprising the halogenated hydrocarbon compound plus an alkane having the formula Y' by a process comprising: (a) contacting the fluid mixture with a dihalopolyalkoxycarbonylalkane; and (b) separating the dihalopolyalkoxycarbonylalkane liquid layer formed thereby from the remaining fluid phase; wherein Y is alkyl, aryl, cycloalkyl, alkylcycloalkyl, cycloalkylalkyl, alkaryl, or aralkyl having 1 to about 15 carbons atoms; wherein Y' is an alkane having 1 to about 15 carbon atoms; and wherein X' is fluorine, chlorine, bromine, or iodine.

The process for the separation of a halogenated hydrocarbon compound from the fluid mixture is particularly applicable wherein X is chlorine; wherein R is hydrogen; wherein R' is alkyl having 1 to 5 carbon atoms; wherein $n$ is 1 to 5; wherein Y is alkyl or cycloalkyl having 2 to 10 carbon atoms; wherein Y' is an alkane having 2 to 10 carbon atoms; and wherein X' is chlorine, bromine, or iodine.

The process is even more suitably employed when R' is methyl; when Y is cyclohexyl; when Y' is octane; and when X' is chlorine, bromine, or iodine.

Some examples of halogenated hydrocarbon compounds which can be separated from fluid mixtures comprising the halogenated hydrocarbon compounds plus an alkane include fluoromethane, bromopentadecane, chlorobenzene, iodobenzene, fluorocyclopentane, fluorocyclopentadecane, 1-chloro-2-methylcyclopentane, 1-fluoro-6-propylcyclododecane, bromocyclopentamethane, 1-chloro-5-cyclodecylpentane, 3-chlorotoluene, 1-chloro - 3,5 - dimethylbenzene, benzylchloride, 1-chloro-9-phenylnonane, and the like.

Particularly suitable results are obtained when chlorocyclohexane, bromocyclohexane, iodocyclohexane, chlorooctane, or chloroethane are employed as the halogenated hydrocarbon compound.

Examples of alkanes include methane, ethane, octane, pentadecane, 2-methylhexane, and the like.

The dihalopolyalkoxycarbonyl alkane is preferably in the liquid state when contacted with the mixture containing the halogenated hydrocarbon compound plus the alkane to be separated. However, it can be in the solid state if the resulting solution comprising the dihalopolyalkoxycarbonyl alkane plus the extracted halogenated hydrocarbon is in the liquid state.

The mixture of halogenated hydrocarbon plus alkane must be in the fluid state, that is, it can be in the gaseous or in the liquid state.

Temperatures and pressures sufficient to maintain the halogenated hydrocarbon, the alkane, and the dihalopolyalkoxycarbonyl alkane in the state above defined, are employed. Often, temperatures in the range of −20 to 100° C. are most suitably employed, and atmospheric pressure is often convenient. However, the invention is not so limited by such temperature and pressure limitations, and any pressure or temperature combination suitable to maintain the compositions in the states specified can be employed.

Subsequent to contacting the fluid mixture with the dihalopolyalkoxycarbonylalkane, the dihalopolyalkoxycarbonylalkane containing liquid layer formed by the contacting can be separated from the remaining fluid phase by any means known to the art for separation of two immiscible liquid phases or a liquid phase from a gas phase. Such techniques are well known to those skilled in the art. Examples of some suitable techniques include decanting, centrifugation, and the like.

Also, according to this invention, an aromatic hydrocarbon having the formula Z–H is separated from a liquid mixture comprising the aromatic hydrocarbon plus an alkane, an alkene, or a mixture of an alkane and alkene having the formula Y″ by a process comprising: (a) contacting the mixture with a dihalopolyalkoxycarbonylalkane of the invention; and (b) separating the dihalopolyalkoxycarbonylalkane containing liquid phase from the other liquid phase formed by the contacting; wherein Y″ is an alkane or alkene having 1 to about 15 carbon atoms; and wherein Z is aryl, alkaryl, or aralkyl having 6 to about 15 carbon atoms.

The process is particularly advantageous when the R group of the dihalopolyalkoxycarbonylalkane is hydrogen; when the R′ group is an alkyl radical having 1 to 5 carbon atoms; when $n$ is 1 to 5; when Y″ is an alkane or alkene having 5 to 15 carbon atoms; and when Z–H is benzene, toluene, or a xylene.

Telomers of methyl acrylate are particularly suitable for separating octane, decane, 1-octene, or tridecane from benzene, toluene, or a xylene.

The dihalopolyalkoxycarbonylalkane plus aromatic hydrocarbon containing phase which is separated from the other liquid phase subsequent to contacting is in the liquid state, however, the dihalopolyalkoxycarbonylalkane can be in the liquid state or in the solid state when contacted with the liquid mixture comprising the aromatic hydrocarbon plus the alkane (and/or alkene). Preferably, it is in the liquid state.

The mixture comprising the aromatic hydrocarbon plus Y″ compound is in the liquid state when contacted with the dihalopolyalkoxycarbonylalkane.

Any pressure and temperature suitable to maintain the materials and phases in the states defined above can be employed. Presently, it is preferred to employ temperatures in the range of −20 to 100° C., and it is often convenient to employ atmospheric pressure. However, the process is not limited to this preferred mode of operation.

Examples of aromatic hydrocarbons which are suitable include benzene, toluene, xylene, ethylbenzene, naphthalene, methylnaphthalene, nonylbenzene, dibutylbenzene, and the like.

Examples of some suitable alkane Y″ compounds are previously listed in this application as the alkanes suitable as Y′ compounds.

Examples of some compounds suitable as Y″ compounds include ethene, 1-octene, 6-pentadecene, 1-dodecene, 1-hexene, 2-methyl-5-decene, and the like.

The following examples are presented so that the invention may be more readily understood. The examples should not be interpreted to limit the invention in any manner.

Example 1

To a stirred reactor were charged 350 g. of freshly distilled methyl acrylate, 91.4 g. of sulfuryl chloride, and 2 drops of cumene hydroperoxide. The resulting mixture was heated to 75° C. at atmospheric pressure wherein reflux occurred along with vigorous evolution of sulfur dioxide. After 3 hours of refluxing, sulfur dioxide evolution ceased. The unreacted methyl acrylate was then distilled from the resulting mixture leaving 107 g. of alpha, omega - dichloropoly(methoxycarbonyl)alkane telomer having a chlorine content of 28.2 percent by weight and an average molecular weight of 266.

This example demonstrates the synthesis of dihalopolyalkoxycarbonylalkanes which are alkyl acrylate telomers.

Example 2

To a stirred reactor were charged 500 ml. of methyl acrylate, 500 ml. of benzene, 55 ml. of sulfuryl chloride, and 2 drops of cumene hydroperoxide. The resulting mixture was heated under reflux at atmospheric pressure for 48 hours with slow release of sulfur dioxide. At the end of the reflux period, benzene and unreacted starting materials were distilled from the reaction mixture to leave 264 g. of alkyl acrylate telomers which are dihalopolyalkoxycarbonylalkanes having an average molecular weight of 623.

This example demonstrates the synthesis of higher molecular weight alkyl acrylate polymers according to this invention.

Example 3

A total of 970 g. of methyl acrylate was charged to a reactor, and refluxing was initiated. A first charge of 70 ml. of sulfuryl chloride was pumped into the refluxing composition at a rate of about 1.5 ml. per minute. A second charge of 60 ml. of sulfuryl chloride was then pumped in at a rate of 0.7 ml. per minute. The reaction mixture was then heated under reflux for 4 hours. Thereupon, methyl acrylate was distilled from the reaction mixture to leave 353 g. of an alkyl acrylate telomer having a chlorine content of 18.3% and an average molecular weight of 406.

This example demonstrates the production of an alkyl acrylate telomer (which is a dihalopolyalkoxycarbonylalkane) having an intermediate molecular weight.

Example 4

A total of 1000 ml. of methyl acrylate was charged to a reactor and refluxed. Over a period of 3 hours, 130 ml. of sulfuryl chloride was then charged to the refluxing mixture. Refluxing was continued at atmospheric pressure for 4 hours after addition of the sulfuryl chloride was complete. Unreacted starting materials were then distilled overhead until the mixture reached a temperature of 120° C. The residual material constituted methyl acrylate telomers having an average molecular weight of 406 and containing 18.3% chlorine. A total of 353 g. of telomer product was produced.

This example further demonstrates the production of a dihalopolyalkoxycarbonylalkane according to the process of the invention.

Example 5

A mixture having 43.75 weight percent 1-chlorohexane and 56.25 weight percent n-octane was shaken with an equal weight of a methyl acrylate telomer similar to that produced in Example 2 and having a molecular weight of 638. After thorough shaking at about 25° C., a liquid upper phase separated from a liquid lower phase. The upper phase was determined to contain 40.22 weight percent 1-chlorohexane and 59.78 weight percent n-octane. Of the materials extracted into the lower phase containing the methyl acrylate telomer, 66.18 weight percent was 1-chlorohexane and 33.82 weight percent was n-octane.

This example demonstrates the separation of a halogenated hydrocarbon compound and an alkane with a dihalopolyalkoxycarbonylalkane according to this invention.

Example 6

The run of Example 5 was repeated except that 1-bromohexane was employed instead of 1-chlorohexane. The original mixture before contacting with the dihalopolyalkoxycarbonylalkane contained 40.09 weight percent 1-bromohexane and 59.91 percent n-octane. Subsequent to shaking with the telomeric product, the upper phase contained 46.18 weight percent 1-bromohexane and 63.82 weight percent n-octane. The lower phase, which contained the dihalopolyalkoxycarbonylalkane, of the extracted materials contained 65.28 percent 1-bromohexane in comparison to 34.72 percent n-octane.

Example 7

The run of Example 5 was repeated except that 1-iodohexane was employed instead of 1-chlorohexane. The original mixture of halogenated hydrocarbon compound plus alkane contained 31.1 weight percent 1-iodohexane and 68.9 weight percent n-octane. The upper phase after shaking contained 28.8 weight percent 1-iodohexane and 71.2 weight percent n-octane. Of the material extracted into the lower telomeric product containing phase which was separated, 53.7 weight percent was 1-iodohexane and 43.6 weight percent was n-octane.

This example and Example 6 further demonstrate the separation of a halogenated hydrocarbon compound from a fluid mixture comprising the halogenated hydrocarbon compound plus an alkane.

Example 8

A liquid mixture comprised of 1-chlorooctane and n-octane was shaken at about 25° C. with an equal weight of a dihalopolyalkoxycarbonylalkane telomer formed by the telomerization of methyl acrylate with sulfuryl chloride, having a molecular weight of 406, and prepared as in Example 3.

The original mixture of 1-chlorooctane and n-octane contained 18.0 weight percent 1-chlorooctane and 82.0 weight percent n-octane. The upper layer formed by separation after shaking contained 29.2 weight percent 1-chlorooctane and 70.8 weight percent n-octane. The lower layer which contained the alkyl acrylate telomer also contained (of the extracted material) 16.1 weight percent 1-chlorooctane and 83.9 weight percent n-octane.

The upper layer was separated from the lower layer by decantation and was then shaken with a second equal weight portion of the methyl acrylate telomer. Following separation into an upper and lower liquid phase, the phases were separated. The upper phase which did not contain the methyl acrylate telomer had 13.6 weight percent 1-chlorooctane and 86.4 weight percent n-octane. Of the 1-chlorooctane and n-octane remaining in the lower phase, containing the methyl acrylate telomer, 21.5 weight percent was 1-chlorooctane and 78.5 weight percent was n-octane.

This example further demonstrates separation of a halogenated hydrocarbon compound from a fluid mixture comprising the halogenated hydrocarbon compound plus an alkane.

Example 9

A gaseous mixture of ethane and ethyl chloride was prepared in a small pressure vessel. Into another vessel having a volume of 7.0 ml. was placed 3.5 ml. of methyl acrylate telomer having a molecular weight of 266 and prepared as in Example 1. The mixture of ethane and ethyl chloride was pressured into the vessel containing the methyl acrylate telomer at a temperature of about 25° C. until the pressure was 50 p.s.i.g. The thus formed mixture was then thoroughly shaken and allowed to separate. The gaseous phase was then analyzed.

Before contacting with the liquid phase dihalopolyalkoxycarbonylalkane (methyl acrylate telomer) the mixture of ethane and ethyl chloride contained 41.7 weight percent ethyl chloride and 58.3 weight percent ethane. Subsequent to shaking in contact with the dihalopolyalkoxycarbonylalkane liquid layer the gaseous phase contained 20.9 weight percent ethyl chloride and 79.1 weight percent ethane.

This example further demonstrates the process for the separation of a halogenated hydrocarbon compound from a fluid mixture comprising a halogenated hydrocarbon compound plus an alkane when the fluid mixture is in the gaseous state.

Example 10

To a stirred reactor was charged 1500 ml. benzene, 300 ml. of sulfuryl chloride, and 1500 ml. of methyl acrylate. The mixture was heated with reflux at atmospheric pressure for about 5 hours during which time sulfur dioxide was evolved at a declining rate. Benzene and unreacted starting materials were removed by distillation until a temperature of 120° C. was reached. The residual material which constituted a methyl acrylate telomer (a dihalopolyalkoxycarbonylalkane) weighed about 1400 grams, had an average molecular weight of 618, contained 13.0 weight percent chlorine, and 0.09 weight percent sulfur.

This example further demonstrates the synthesis of a dihalopolyalkoxycarbonylalkane, which is an alkyl acrylate telomer, according to this invention.

Example 11

At about 25° C., a mixture of benzene, n-octane, and n-decane were shaken with an equal weight of methyl acrylate telomer produced according to Example 10, and having an average molecular weight of 618. After separation of the liquid phases, the distribution of hydrocarbons was determined by gas chromatography.

The original hydrocarbon mixture, containing benzene, n-octane, and n-decane, had 51.3 weight percent benzene, 27.5 weight percent n-octane, and 21.0 weight percent decane. After separation of the phases, the upper phase, which was the hydrocarbon phase, contained 43.7 weight percent benzene, 29.7 weight percent octane, and 26.6 weight percent decane. The lower phase which was the methyl acrylate telomer containing phase contained extracted hydrocarbons in the following proportions: 98.4 weight percent benzene, 1.1 weight percent octane, and 0.5 weight percent decane.

Example 12

The run of Example 11 was repeated except that a mixture of benzene and tridecane having 54.1 weight percent benzene and 45.9 weight percent tridecane was employed in lieu of the mixture of benzene, octane, and decane employed in Example 11.

Following shaking and separation of the liquid phases, the upper hydrocarbon-containing phase contained 33.3 percent benzene and 66.7 weight percent tridecane. The lower phase, which was the alkyl acrylate telomer containing phase, contained extracted hydrocarbons in the following proportions: 88.5 weight percent benzene and 11.5 weight percent tridecane.

Example 13

Example 12 was repeated except that toluene was employed instead of benzene. The hydrocarbon mixture prior to extraction contained 48.4 weight percent toluene and 51.6 weight percent tridecane. Subsequent to extraction the upper hydrocarbon containing phase, which was separated from the alkyl acrylate containing phase, contained 36.9 weight percent toluene and 63.1 weight percent tridecane. The lower phase, which contained the dihalopolyalkoxycarbonylalkane, contained extracted hydrocarbons in the following proportions: 98.8 weight percent toluene and 1.2 weight percent tridecane.

Example 14

A mixture containing 54.1 weight percent benzene and 45.9 weight percent tridecane were shaken at about 25° C. with the dihalopolyalkoxycarbonylalkane product produced according to Example 10. Following separation into two liquid phases the phases were separated, and the upper phase was found to contain 34.3 weight percent benzene and 65.7 weight percent tridecane. The lower dihalopolyalkoxycarbonylalkane liquid layer contained extracted hydrocarbons in the following proportions: 93.2 weight percent benzene and 6.8 weight percent tridecane.

Example 15

A mixture containing 47.7 weight percent benzene and 52.3 weight percent 1-octene was shaken with a dihalopolyalkoxycarbonylalkane telomeric product formed by the reaction of sulfuryl chloride and methyl acrylate, having a molecular weight of 375. Equal weights of the hydrocarbon mixture and the telomer were contacted at about 25° C. Following separation of the liquid phases, the upper phase, which was the hydrocarbon phase, was found to contain 40.1 weight percent benzene and 59.9 weight percent 1-octene. The lower phase, which was the methyl acrylate telomer containing phase, contained extracted hydrocarbons in the following proportions: 97.4 weight percent benzene and 2.7 weight percent 1-octene.

Examples 12, 13, 14, and 15 demonstrate this invention wherein an aromatic hydrocarbon is extracted from a mixture comprising an aromatic hydrocarbon plus an alkane and/or an alkene.

I claim:
1. Dihalopolyalkoxycarbonylalkanes represented by the following formula:

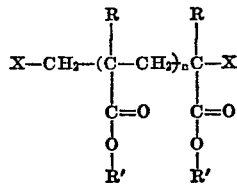

wherein X is fluorine, chlorine, bromine, or iodine; wherein R is hydrogen or methyl; wherein R' is alkyl having 1 to about 20 carbon atoms; and wherein n is 2 to about 10.

2. The dihalopolyalkoxycarbonylalkanes of claim 1 wherein X is chlorine; wherein R is hydrogen; wherein R' is alkyl having 1 to 5 carbon atoms; and wherein n is 2 to 5.

3. The dihalopolyalkoxycarbonylalkanes of claim 2 wherein R' is methyl.

4. The dihalopolyalkoxycarbonylalkane of claim 3 wherein n is 2.

5. The dihalopolyalkoxycarbonylalkane of claim 3 wherein n is 3.

6. A process for producing the dihalopolyalkoxycarbonylalkanes which comprises contacting an alkyl 2-alkenate and a sulfuryl halide to form a telomer, which is a dihalopolyalkoxycarbonylalkane, according to the following representation:

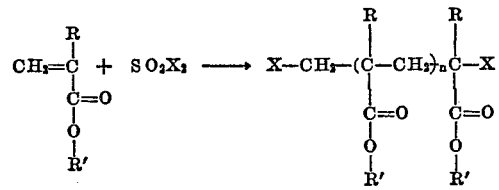

wherein X is fluorine, chlorine, bromine or iodine; wherein R is hydrogen or methyl; wherein R' is alkyl having 1 to about 20 carbon atoms; and wherein n is 1 to about 10, said process being characterized further in that:
(a) a temperature of 25 to 250° C. is employed,
(b) a pressure of 10 p.s.i.a. to 30,000 p.s.i.g. is employed,
(c) about 1 to about 1,000 moles of alkyl 2-alkenate is employed for each mole of sulfuryl halide, and
(d) chemical free radical initiation or thermal initiation is employed.

7. The process of claim 6 wherein X is chlorine; wherein R is hydrogen; wherein R' is alkyl having 1 to 5 carbon atoms; and wherein n is 2 to 5.

8. The process of claim 7 wherein R' is methyl.

9. The process of claim 8 wherein about 0.0001 to 0.10 mole of chemical free radical initiator is employed for each mole of sulfuryl halide.

10. The process of claim 9 wherein a temperature of 50 to 150° C. is employed, wherein a pressure of 10 p.s.i.a to 1000 p.s.i.g. is employed, and wherein the chemical free radical initiator is cumene hydroperoxide.

11. The process of claim 6 wherein X is chlorine; wherein R is hydrogen; wherein R' is methyl; wherein n is 1 to 10; wherein a temperature of 50 to 250° C. is employed; wherein a pressure of 10 p.s.i.a. to 1000 p.s.i.g. is employed; and wherein the free radical initiation is by thermal means.

References Cited
UNITED STATES PATENTS 3,600,434    8/1971    Rust et al. _____ 260—485 F
2,837,580    6/1958    Barnhart _____ 260—653

LORRAINE A. WEINBERGER, Primary Examiner

E. J. SKELLY, Assistant Examiner

U.S. Cl. X.R.

204—158 HE; 260—485 F, 648 R, 648 C, 648 F, 649 R, 649 F, 650 F, 650 R, 651 R, 651 F, 652 P, 653, 674 A, 674 SE